(12) United States Patent
Martin

(10) Patent No.: US 11,080,986 B1
(45) Date of Patent: Aug. 3, 2021

(54) FIREFIGHTER ACCOUNTABILITY ASSEMBLY

(71) Applicant: Keith Martin, Coral Springs, FL (US)

(72) Inventor: Keith Martin, Coral Springs, FL (US)

(*) Notice: Subject to any disclaimer, the term of this patent is extended or adjusted under 35 U.S.C. 154(b) by 0 days.

(21) Appl. No.: 17/003,366

(22) Filed: Aug. 26, 2020

(51) Int. Cl.
  *G08B 25/00* (2006.01)
  *G08B 25/14* (2006.01)
  *G06Q 10/06* (2012.01)
  *H04W 76/50* (2018.01)

(52) U.S. Cl.
  CPC ....... *G08B 25/14* (2013.01); *G06Q 10/06311* (2013.01); *G08B 25/009* (2013.01); *H04W 76/50* (2018.02)

(58) Field of Classification Search
  CPC G08B 25/14; G08B 25/009; G06Q 10/06311; H04W 76/50
  See application file for complete search history.

(56) References Cited

U.S. PATENT DOCUMENTS

| | | | |
|---|---|---|---|
| 5,552,772 A | 9/1996 | Janky | |
| 5,793,882 A | 8/1998 | Piatek | |
| 6,029,889 A * | 2/2000 | Whalen, Jr. | G08B 21/02 235/380 |
| 6,824,065 B2 | 11/2004 | Boone et al. | |
| 7,091,852 B2 | 8/2006 | Mason | |
| 7,633,387 B2 * | 12/2009 | Carmichael | A62C 99/00 340/539.13 |
| D613,293 S | 4/2010 | Sheba | |
| 7,772,976 B2 | 8/2010 | Christopher | |
| 8,860,571 B2 | 10/2014 | Mahajan | |
| 9,858,791 B1 * | 1/2018 | O'Connor | G08B 21/12 |
| 2004/0174269 A1 * | 9/2004 | Miller | G07C 9/28 340/8.1 |
| 2005/0165616 A1 * | 7/2005 | Ellis | G06Q 10/10 340/539.13 |
| 2006/0158329 A1 * | 7/2006 | Berkley | H04W 76/50 340/539.13 |
| 2019/0206233 A1 * | 7/2019 | Huseth | G08B 27/001 |

* cited by examiner

*Primary Examiner* — Toan N Pham

(57) ABSTRACT

A firefighter accountability assembly includes a master board that is mounted on a vertical support surface thereby facilitating the master board to be visible to a user. A plurality of panels is included and each of the panels is assigned to a respective one of a plurality of emergency vehicles. A plurality of tumbler units is provided and each of the tumbler units is rotatably coupled to a respective one of the panels. Each of the tumbler units has a plurality of numbers printed thereon and each is assigned to an emergency responder. Each of the tumbler units is manipulated by the assigned emergency responder to display a predetermined numerical code that has been assigned to the assigned emergency responder. In this way each of the tumbler units on each of the panels displays the emergency responders that are assigned to and are on board each of the emergency vehicles.

7 Claims, 5 Drawing Sheets

US 11,080,986 B1

FIREFIGHTER ACCOUNTABILITY ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relates to accountability devices and more particularly pertains to a new accountability device for tracking firefighters during a response to a fire.

(h) BRIEF SUMMARY OF THE INVENTION

An embodiment of the disclosure meets the needs presented above by generally comprising a master board that is mounted on a vertical support surface thereby facilitating the master board to be visible to a user. A plurality of panels is included and each of the panels is assigned to a respective one of a plurality of emergency vehicles. A plurality of tumbler units is provided and each of the tumbler units is rotatably coupled to a respective one of the panels. Each of the tumbler units has a plurality of numbers printed thereon and each is assigned to an emergency responder. Each of the tumbler units is manipulated by the assigned emergency responder to display a pre-determined numerical code that has been assigned to the assigned emergency responder. In this way each of the tumbler units on each of the panels displays the emergency responders that are assigned to and are on board each of the emergency vehicles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
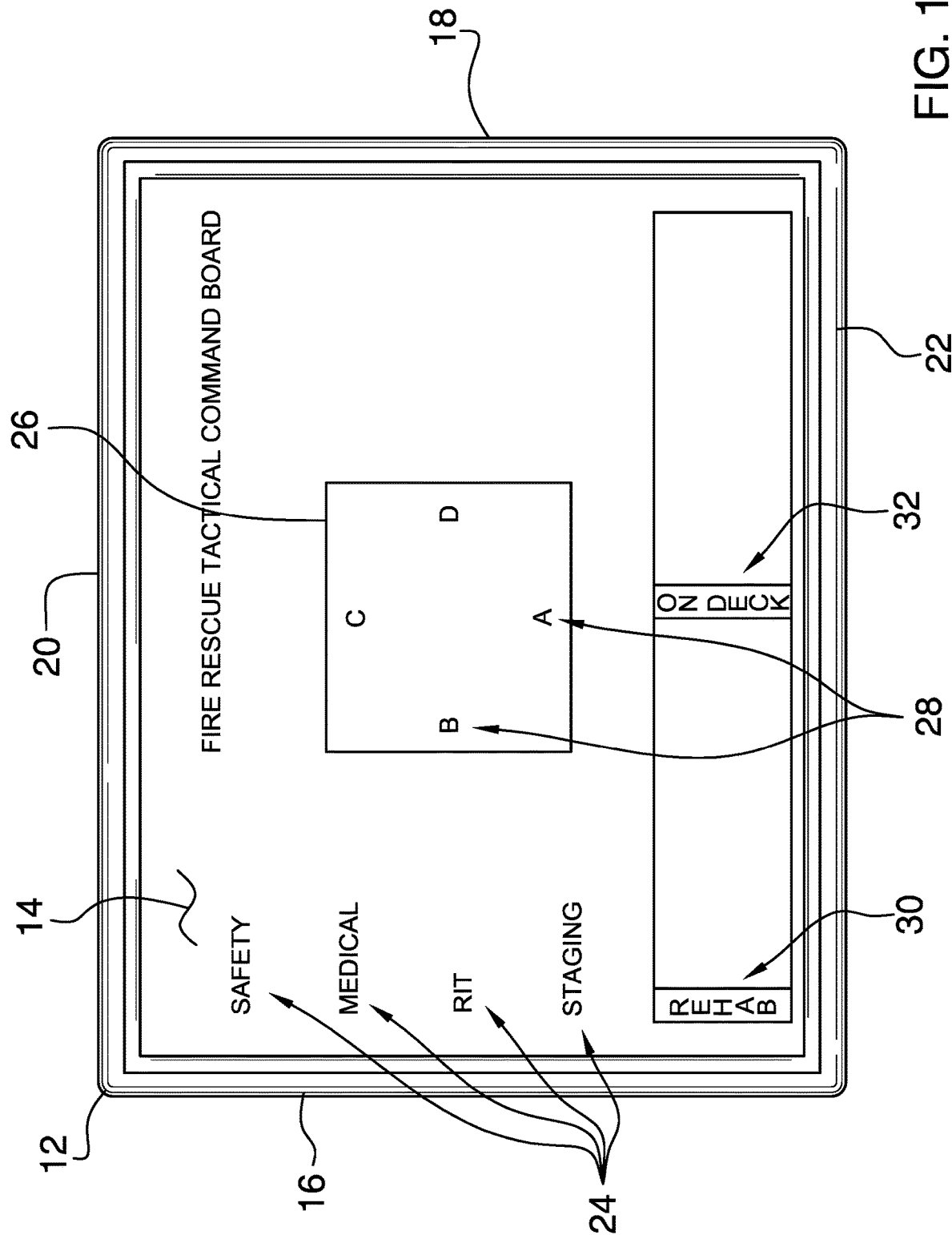
FIG. 1 is a front view of a master board of a firefighter accountability assembly according to an embodiment of the disclosure.
Figure 2:
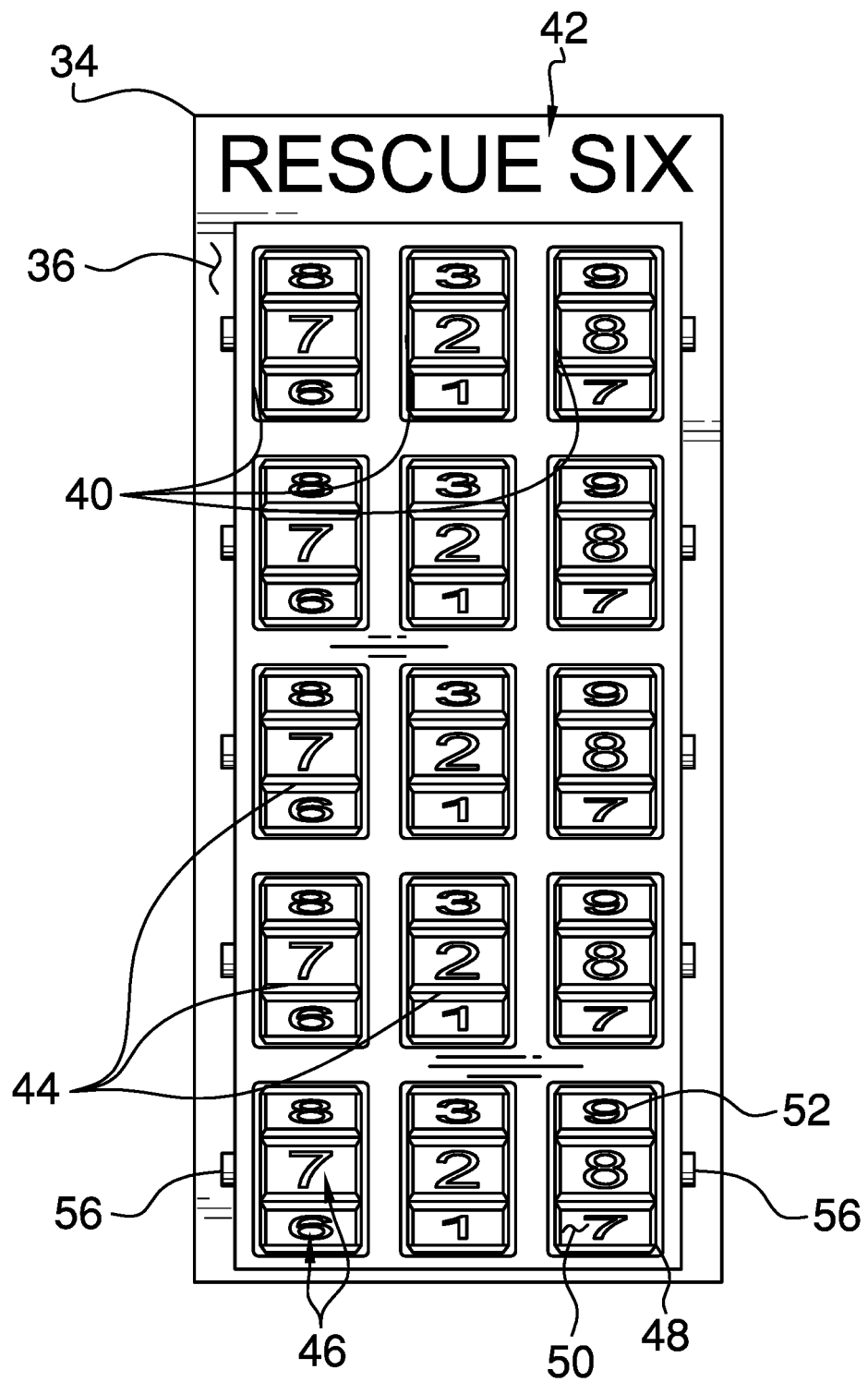
FIG. 2 is a front view of panel and a plurality of tumbler units of an embodiment of the disclosure.
Figure 3:
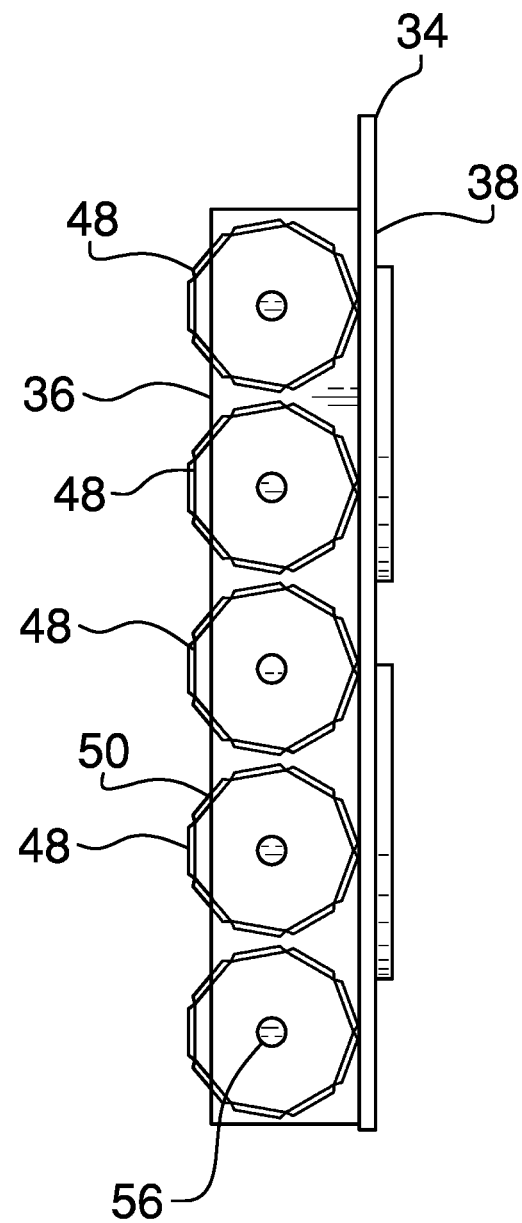
FIG. 3 is a left side phantom view of a panel and a plurality of tumbler units of an embodiment of the disclosure.
Figure 4:
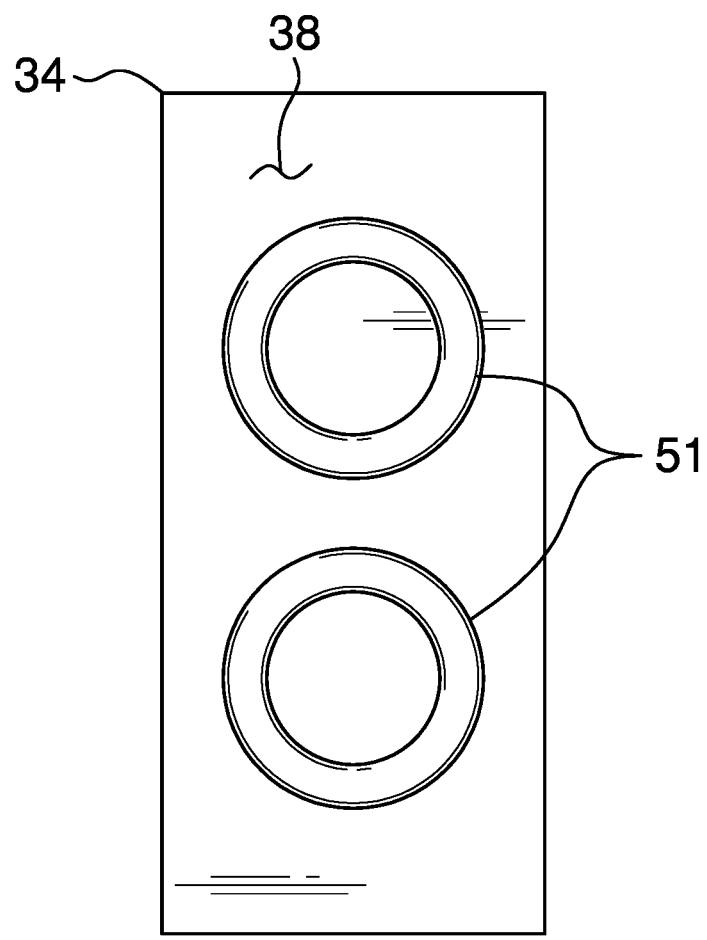
FIG. 4 is a back view of panel of an embodiment of the disclosure.
Figure 5:
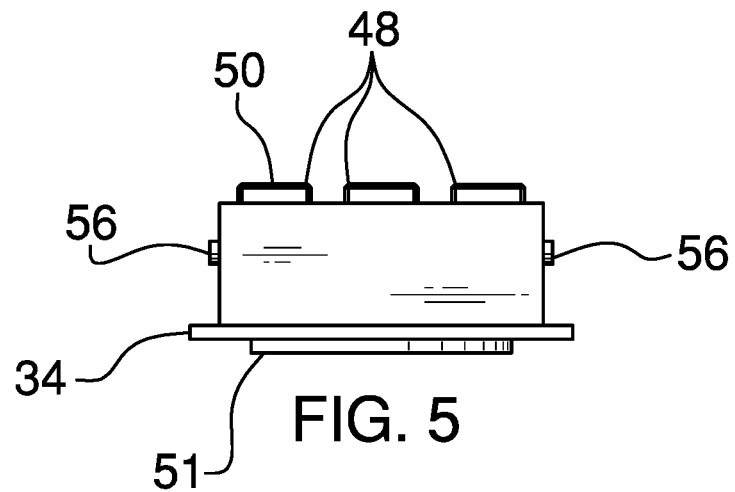
FIG. 5 is a bottom view of panel of an embodiment of the disclosure.
Figure 6:
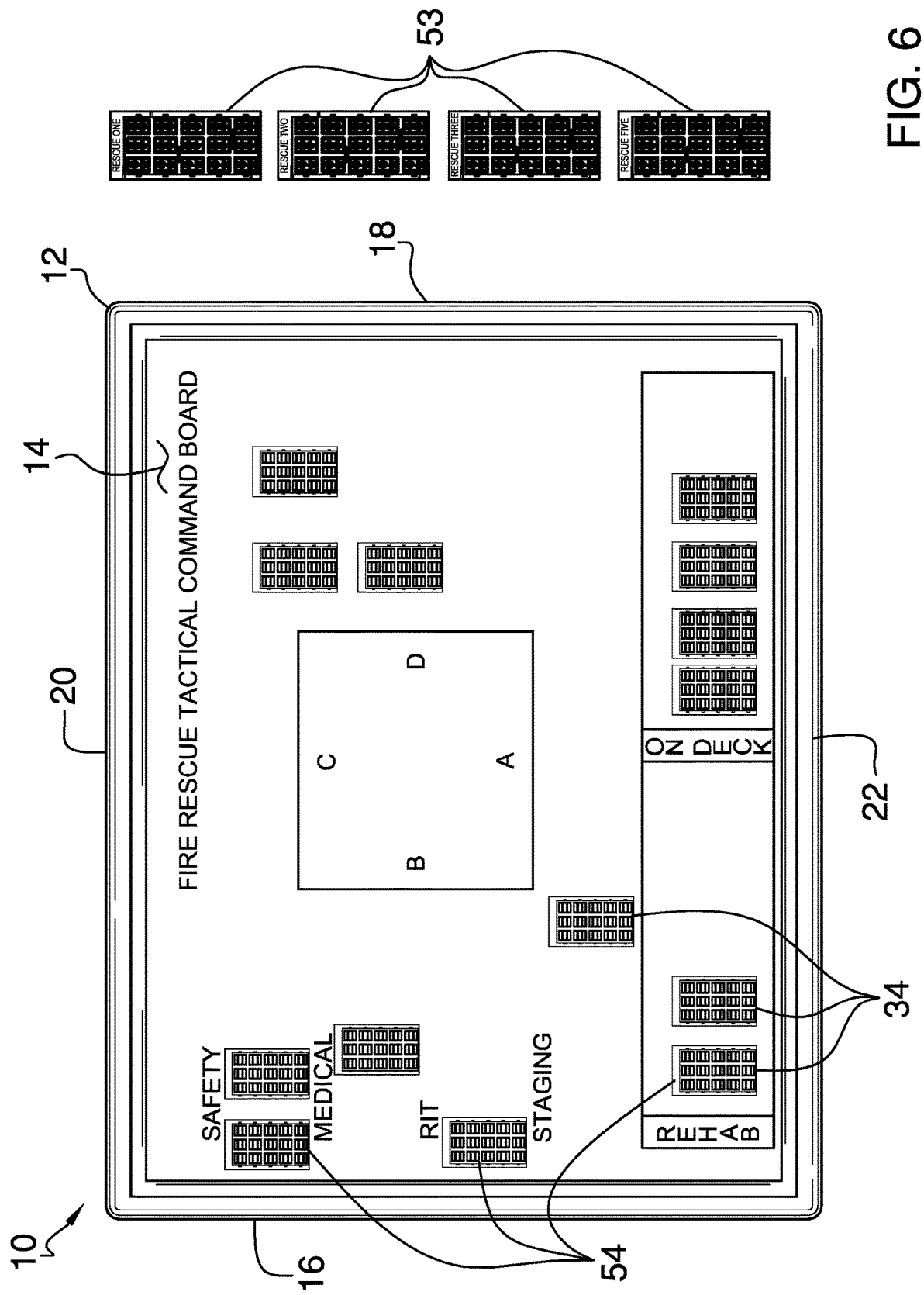
FIG. 6 is a perspective in-use view of an embodiment of the disclosure.

With reference now to the drawings, and in particular to FIGS. 1 through 6 thereof, a new accountability device embodying the principles and concepts of an embodiment of the disclosure and generally designated by the reference numeral 10 will be described.

As best illustrated in FIGS. 1 through 6, the firefighter accountability assembly 10 generally comprises a master board 12 that may be mounted on a vertical support surface thereby facilitating the master board 12 to be visible to a user. The user may be a fire station commander or other authorized individual that tracks the assignment and location of firefighters during a response to a fire. The master board 12 is comprised of a magnetic material such as magnetic metal or the like.

The master board 12 has a first surface 14, a first lateral edge 16, a second lateral edge 18, a top edge 20 and a bottom edge 22. The first surface 14 has category indicia 24 printed thereon comprising the words "safety", "medical", "RIT" and "staging". The words are spaced apart from each other and are distributed along the first lateral edge 16 of the master board 12. The first surface 14 has a rectangle 26 printed thereon and the rectangle 26 is centrally positioned on the first surface 14. The first surface 14 has letter indicia 28 printed thereon comprising the letters "A, "B", "C" and "D" that is each positioned within the rectangle 26 and is each aligned with a respective one of four sides of the rectangle 26. The first surface 14 has rehab indicia 30 printed thereon comprising a rehab block that is aligned with the bottom side of the master board 12. The first surface 14 has on deck indicia 32 printed thereon comprising an on deck block that is aligned with the bottom side of the master board 12 and is positioned adjacent to the rehab block.

A plurality of panels 34 is provided and each of the panels 34 is assigned to a respective one of a plurality of emergency vehicles. The emergency vehicles may be fire trucks, ambulances and other emergency vehicles that are assigned to the fire station. Each of the panels 34 has a front surface 36 and a back surface 38, and the front surface 36 of each of the panels 34 has a plurality of wells 40 extending toward the back surface 38. The wells 40 on each of the panels 34 are vertically distributed on the front surface 36 and the wells 40 are arranged into a pair of columns. The front surface 36 of each of the panels 34 has emergency vehicle indicia 42 printed thereon comprising a name of the respective emergency vehicle. The emergency vehicle indicia 42 on each of the panels 34 are positioned between the wells 40 on the panels 34 and a top side of the panels 34.

A plurality of tumbler units 44 is provided and each of the tumbler units 44 is rotatably coupled to a respective one of the panels 34. Each of the tumbler units 44 has a plurality of numbers 46 printed thereon. Moreover, each of the tumbler units 44 is assigned to an emergency responder who is assigned to the respective emergency vehicle with respect to the panel on which each tumbler unit is positioned. Each of the tumbler units 44 is manipulated by the assigned emergency responder to display a pre-determined numerical code that has been assigned to the assigned emergency responder. In this way each of the tumbler units 44 on each of the panels 34 can display the emergency responders that are assigned to and are on board each of the emergency vehicles. Thus, the tumbler units 44 communicate the location and assignments of the emergency responders to the user or other observer. Moreover, the panels 34 and the tumbler units 44 serve to replace the current use of par-tags to account for emergency responders on each emergency vehicle.

Each of the tumbler units 44 comprises a plurality of wheels 48, and each of the wheels 48 has an outer surface 50 extending around an entire circumference of the wheels 48. The outer surface 50 of each of the wheels 48 has numerical indicia 52 printed thereon comprising the numbers zero through nine. Each of the wheels 48 is rotatably positioned in a respective one of the wells 40 in the respective panel 34 having the outer surface 50 being exposed on the front surface 36 of the respective panel 34. Additionally, each of the wheels 48 is manipulated to display a selected one of the numbers 46 thereon thereby displaying the pre-determined numerical code. Each of the wheels 48 may have all of the letters of the alphabet printed thereon and the wheels 48 may be manipulated to display the name or an abbreviation of the name of the assigned emergency responder.

A plurality of magnets 51 is provided and each of the magnets 51 is coupled to the back surface 38 of a respective one of the panels 34. The plurality of panels 34 is divided into a set of emergency vehicle panels 53 and a set of master board panels 54. The emergency vehicle panels 53 are assigned positioned within the emergency vehicle to which the emergency panel 52 is assigned. Each of the magnets 51 on the emergency vehicle panels 53 magnetically engages the emergency vehicle to retain the emergency panels 52 on the emergency vehicle. Additionally, the emergency vehicle panels 53 are positioned in a conspicuous location within the assigned emergency vehicle. Each of the magnets 51 on each of the set of master board panels 54 magnetically engages the first surface 14 of the master board 12 to retain the set of master board panels 54 on the master board 12.

A plurality of locks 56 is included and each of the locks 56 is movably coupled to a respective one of the panels 34. Each of the locks 56 engages a respective one of the wheels 48 to inhibit the respective wheel from rotating. Moreover, each of the locks 56 is manipulated to selectively disengage the respective wheel 48 thereby facilitating the respective wheel 48 to rotate. Each of the locks 56 may be spring loaded locks 56 that are biased to frictionally engage the respective wheel 48 or any other type of releasable mechanical lock. Alternatively, each of the tumbler units 44 may be replaced with a digital display that displays the name of the assigned emergency responder.

In use, the master board 12 is positioned in the fire station, carried by the fire station commander or employed in accordance with established emergency responder accountability practices in fire stations. Each of the set of emergency vehicle panels 53 is positioned in the assigned emergency vehicle as a replacement for existing par tags employed by fire stations. Each of the wheels 48 on each of the tumbler units 44 is rotated to display the pre-determined numerical code, or the name, of the assigned emergency responder. In this way each of the emergency responders that are assigned to the assigned emergency vehicle is displayed. Additionally, each of the set of master board panels 54 is positioned on the master board 12 to indicate a location and assignment of each emergency vehicle with respect to the fire response. In this way the location of each emergency vehicle, as well as the location of each emergency responder, can be tracked during the response to the fire.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firefighter accountability assembly being configured to track vehicles and tasks to which firefighters have been assigned, the assembly comprising:
    a master board being mounted on a vertical support surface thereby facilitating the master board to be visible to a user, the master board being comprised of a magnetic material;
    a plurality of panels, each of the panels being assigned to a respective one of a plurality of emergency vehicles, selected ones of the panels being removably coupled to the master board;
    a plurality of tumbler units, each of the tumbler units being rotatably coupled to a respective one of the panels, each of the tumbler units having a plurality of numbers being printed thereon, each of the tumbler units being assigned to an emergency responder who is assigned to the respective emergency vehicle with respect to the panel on which each tumbler unit is positioned, each of the tumbler units being manipulated by the assigned emergency responder to display a pre-determined numerical code that has been assigned to the assigned emergency responder thereby facilitating each of the tumbler units on each of the panels to display the emergency responders that are assigned to and are on board each of the emergency vehicles wherein the tumbler units are configured to communicate the location and assignments of the emergency responders to the user.

2. The assembly according to claim 1, wherein:
the master board has a first surface, a first lateral edge, a second lateral edge, a top edge and a bottom edge;
the first surface has category indicia being printed thereon comprising the words "safety", "medical", "RIT", and "staging", the words being spaced apart from each other and being distributed along the first lateral edge of the master board;
the first surface has a rectangle being printed thereon and being centrally positioned on the first surface;
the first surface has letter indicia being printed thereon comprising the letters "A, "B", "C" and "D" each being positioned within the rectangle and each being aligned with a respective one of four sides of the rectangle;
the first surface has rehab indicia being printed thereon comprising a rehab block being aligned with the bottom side of the master board; and
the first surface has deck indicia being printed thereon comprising an on deck block being aligned with the bottom side of the master board and being positioned adjacent to the rehab block.

3. The assembly according to claim 1, wherein:
each of the panels has a front surface and a back surface;
the front surface of each of the panels having a plurality of wells extending toward the back surface, the wells on each of the panels being vertically distributed on the front surface, the wells being arranged into a pair of columns;
the front surface of each of the panels having emergency vehicle indicia being printed thereon comprising a name of the respective emergency vehicle, the emergency vehicle indicia on each of the panels being positioned between the wells on the panels and a top side of the panels.

4. The assembly according to claim 3, wherein each of the tumbler units comprises a plurality of wheels, each of the wheels having an outer surface extending around an entire circumference of the wheels, the outer surface of each of the wheels having numerical indicia being printed thereon comprising the numbers zero through nine, each of the wheels being rotatably positioned in a respective one of the wells in the respective panel having the outer surface being exposed on the front surface of the respective panel, each of the wheels being manipulated to display a selected one of the number thereon thereby displaying the pre-determined numerical code.

5. The assembly according to claim 4, further comprising a plurality of magnets, each of the magnets being coupled to the back surface of a respective one of the panels, each of the magnets magnetically engaging the first surface of the master board to retain the panels on the master board.

6. The assembly according to claim 4, further comprising a plurality of locks, each of the locks being movably coupled to a respective one of the panels, each of the locks engaging a respective one of the wheels to inhibit the respective wheel from rotating, each of the locks being selectively disengaging the respective wheel thereby facilitating the respective wheel to rotate.

7. A firefighter accountability assembly being configured to track vehicles and tasks to which firefighters have been assigned, the assembly comprising:
a master board being mounted on a vertical support surface thereby facilitating the master board to be visible to a user, the master board being comprised of a magnetic material, the master board having a first surface, a first lateral edge, a second lateral edge, a top edge and a bottom edge, the first surface having category indicia being printed thereon comprising the words "safety", "medical", "RIT", and "staging", the words being spaced apart from each other and being distributed along the first lateral edge of the master board, the first surface having a rectangle being printed thereon and being centrally positioned on the first surface, the first surface having letter indicia being printed thereon comprising the letters "A, "B", "C" and "D" each being positioned within the rectangle and each being aligned with a respective one of four sides of the rectangle, the first surface having rehab indicia being printed thereon comprising a rehab block being aligned with the bottom side of the master board, the first surface having deck indicia being printed thereon comprising an on deck block being aligned with the bottom side of the master board and being positioned adjacent to the rehab block;
a plurality of panels, each of the panels being assigned to a respective one of a plurality of emergency vehicles, each of the panels having a front surface and a back surface, the front surface of each of the panels having a plurality of wells extending toward the back surface, the wells on each of the panels being vertically distributed on the front surface, the wells being arranged into a pair of columns, the front surface of each of the panels having emergency vehicle indicia being printed thereon comprising a name of the respective emergency vehicle, the emergency vehicle indicia on each of the panels being positioned between the wells on the panels and a top side of the panels;
a plurality of tumbler units, each of the tumbler units being rotatably coupled to a respective one of the panels, each of the tumbler units having a plurality of numbers being printed thereon, each of the tumbler units being assigned to an emergency responder who is assigned to the respective emergency vehicle with respect to the panel on which each tumbler unit is positioned, each of the tumbler units being manipulated by the assigned emergency responder to display a pre-determined numerical code that has been assigned to the assigned emergency responder thereby facilitating each of the tumbler units on each of the panels to display the emergency responders that are assigned to and are on board each of the emergency vehicles wherein the tumbler units are configured to communicate the location and assignments of the emergency responders to the user, each of the tumbler units comprising a plurality of wheels, each of the wheels having an outer surface extending around an entire circumference of the wheels, the outer surface of each of the wheels having numerical indicia being printed thereon comprising the numbers zero through nine, each of the wheels being rotatably positioned in a respective one of the wells in the respective panel having the outer surface being exposed on the front surface of the respective panel, each of the wheels being manipulated to display a selected one of the number thereon thereby displaying the pre-determined numerical code;

a plurality of magnets, each of the magnets being coupled to the back surface of a respective one of the panels, each of the magnets magnetically engaging the first surface of the master board to retain the panels on the master board; and a plurality of locks, each of the locks being movably coupled to a respective one of the panels, each of the locks engaging a respective one of the wheels to inhibit the respective wheel from rotating, each of the locks being selectively disengaging the respective wheel thereby facilitating the respective wheel to rotate.

* * * * *